United States Patent
Lee et al.

(10) Patent No.: US 6,208,431 B1
(45) Date of Patent: Mar. 27, 2001

(54) METHOD OF ELIMINATING ARTIFACTS IN DISPLAY DEVICES

(75) Inventors: Ho Chong Lee, Endicott, NY (US); Mikel J. Stanich, Longmont, CO (US); Gerhard R. Thompson, Wappingers Falls, NY (US); Jack L. Zable, Niwot, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,937

(22) Filed: Mar. 31, 1998

(51) Int. Cl.[7] .............................. H04N 1/405; H04N 1/52
(52) U.S. Cl. ...................... 358/1.9; 358/457; 358/535; 382/270; 382/275
(58) Field of Search ....................... 398/1.9; 358/533, 358/534, 536, 535, 454, 456, 457, 458, 460, 298, 466; 382/275, 270, 237

(56) References Cited

U.S. PATENT DOCUMENTS

| | | | |
|---|---|---|---|
| 4,653,926 | * 3/1987 | Fukui | 356/144 |
| 5,406,379 | * 4/1995 | Kingsley et al. | 358/298 |
| 5,442,461 | 8/1995 | Levien | 358/456 |
| 5,452,403 | 9/1995 | Miller | 358/1.9 |
| 5,463,720 | 10/1995 | Granger | 358/1.9 |
| 5,553,200 | * 9/1996 | Accad | 358/1.9 |
| 5,737,452 | * 4/1998 | Schiller | 382/270 |
| 5,854,882 | * 12/1998 | Wang | 358/1.9 |

OTHER PUBLICATIONS

"Visual Contrast Sensitivity", By: D.H. Kelly, published in 1977 (Optica Acta 24, No. 2, pp. 107–129.
"Optical and Retinal Factors Affecting Visual Resolution", By: F. W. Campbell and D. G. Green, published in J. Physiol. 181, pp. 576–593 (1965).
"Periodic image artifacts from continuous–tone laser scanner", published in Applied Optics, vol. 25, No. 21, pp. 3880–3884, Nov. 1986.
"A continuous–Tone Laser Color Printer", Journal of Imaging Technology, vol. 14, No. 3, Jun. 1988, pp. 18–88.
"The human visual system: A guide for the display technologist", By: B. E. Rogowitz, Proceedings of the SED, vol. 24/3, 1983, pp. 235–252.
"Economic Display Design", By: C. Calson, Information Display, vol. 4, No. 5, May 1988, pp. 16–19.

* cited by examiner

Primary Examiner—Scott Rogers
(74) Attorney, Agent, or Firm—Patrick J. Daugherty; Driggs, Lucas, Brubaker & Hogg Co., L.P.A.

(57) ABSTRACT

A method of generating artifact-free threshold matrices for digital printing devices is provided. The method includes, for example, the steps of establishing a threshold matrix by examining at least one color level for artifacts and removing the color level from the threshold matrix if it has artifacts. The method further includes the steps of examining a range of color levels for artifacts and removing the color levels from the threshold matrix which have artifacts and evenly distributing the remaining color levels over a range of color levels from a first color level to a last color. The examination of color levels for artifacts may be implemented manually or through an automated computer controlled process. The automated process includes digitally acquiring the color level and performing a Fourier transform on the color level to determine its spectral components. The spectral components are analyzed to determine the presence or absence of artifacts. Color levels having artifacts may be removed from a threshold matrix via one of several removal procedures. Once the threshold matrix is defined by artifact-free color levels, it is then integrated or stored into a printer or display device.

18 Claims, 5 Drawing Sheets

| 1 | 33 | 97 | 209 | 193 | 129 | 65 | 25 | 3 | 35 | 99 | 211 | 195 | 131 | 67 | 27 |
|---|---|---|---|---|---|---|---|---|---|---|---|---|---|---|---|
| 9 | 57 | 121 | 233 | 217 | 153 | 81 | 41 | 11 | 59 | 123 | 235 | 219 | 155 | 83 | 43 |
| 145 | 169 | 185 | 113 | 89 | 137 | 177 | 105 | 147 | 171 | 187 | 115 | 91 | 139 | 179 | 107 |
| 249 | 225 | 161 | 73 | 17 | 49 | 201 | 241 | 251 | 227 | 163 | 75 | 19 | 51 | 203 | 243 |
| 197 | 133 | 69 | 29 | 7 | 39 | 103 | 215 | 199 | 135 | 71 | 31 | 5 | 37 | 101 | 213 |
| 221 | 157 | 85 | 45 | 15 | 63 | 127 | 239 | 223 | 159 | 87 | 47 | 13 | 61 | 125 | 237 |
| 93 | 141 | 181 | 109 | 151 | 175 | 191 | 119 | 95 | 143 | 183 | 111 | 149 | 173 | 189 | 117 |
| 21 | 53 | 205 | 245 | 255 | 231 | 167 | 79 | 23 | 55 | 207 | 247 | 253 | 229 | 165 | 77 |
| 4 | 36 | 100 | 212 | 196 | 132 | 68 | 28 | 2 | 34 | 98 | 210 | 194 | 130 | 66 | 26 |
| 12 | 60 | 124 | 236 | 220 | 156 | 84 | 44 | 10 | 58 | 122 | 234 | 218 | 154 | 82 | 42 |
| 148 | 172 | 188 | 116 | 92 | 140 | 180 | 108 | 146 | 170 | 186 | 114 | 90 | 138 | 178 | 106 |
| 252 | 228 | 164 | 76 | 20 | 52 | 204 | 244 | 250 | 226 | 162 | 74 | 18 | 50 | 202 | 242 |
| 200 | 136 | 72 | 32 | 6 | 38 | 102 | 214 | 198 | 134 | 70 | 30 | 8 | 40 | 104 | 216 |
| 224 | 160 | 88 | 48 | 14 | 62 | 126 | 238 | 222 | 158 | 86 | 46 | 16 | 64 | 128 | 240 |
| 96 | 144 | 184 | 112 | 150 | 174 | 190 | 118 | 94 | 142 | 182 | 110 | 152 | 176 | 192 | 120 |
| 24 | 56 | 208 | 248 | 254 | 230 | 166 | 78 | 22 | 54 | 206 | 246 | 256 | 232 | 168 | 80 |

METHOD OF ELIMINATING ARTIFACTS IN DISPLAY DEVICES

FIELD OF THE INVENTION

The invention relates generally to the rendering of images in a digital printing process, and more particularly, to methods and devices for eliminating artifacts in multi-cell color levels, including gray levels.

BACKGROUND OF THE INVENTION

Artifacts are printed pixel patterns which appear objectionable for a given solid color area. More specifically, artifacts appear as low frequency patterns in the color level. These patterns make the color level appear as a distinct combination of two or more colors and patterns rather than a uniform single color level. Conversely, artifact-free color levels have fine dot patterns which are difficult to observe.

Artifacts arise from the fact that most display devices such as, for example, printers, do not have enough available color levels to render all the color levels desired for a high quality image. Accordingly, such display devices must employ some type of halftoning to render all of the required color levels. Consequently, some of the halftone patterns employed by such devices for the required color levels include artifacts. The result is often a rendered image which has one or more areas appearing un-natural or "grainy" rather than smooth.

SUMMARY OF THE INVENTION

According to one aspect of the present invention, a method of selecting artifact-free color levels, including gray levels, for rendering images is provided. The method includes, for example, the steps of establishing a threshold matrix with a large number of color levels (preferably greater than 256) for each color, then examining at least one color level for artifacts and removing or modifying the color level in the threshold matrix if it has artifacts. The method further includes the steps of examining a range of color levels for artifacts, removing or modifying the color levels from the threshold matrix which have artifacts, and distributing the remaining color levels over a range of color levels from a first color level to a last color level. Once the threshold matrix is defined or optimized, it is then integrated or stored into a printer or display device.

According to another embodiment of the present invention, a method of selecting artifact-free gray levels for rendering images is provided. The method includes the steps of, for example, establishing a threshold matrix by examining at least one gray level for an artifact and if the gray level has an artifact, identifying the gray level for removal by modifying the threshold matrix. The step of examining at least one gray level for an artifact includes the step of digitally acquiring the gray level, performing a two dimensional Fourier transform to determine the spectral components of the gray level, and comparing at least one spectral component to a visual sensitivity threshold function to determine if the gray level has artifacts.

According to another embodiment of the present invention, a method of selecting artifact-free gray levels by employing an optical density measurement is provided. The method includes, for example, the steps of establishing a threshold matrix by examining the optical density power spectrum of at least one gray level for an artifact and if the gray level has an artifact, identifying the gray level for removal or modification in the threshold matrix. The step of examining the optical density power spectrum of at least one gray level for an artifact includes the step of optically scanning at least one gray level along at least a first dimensional component to arrive at a gray level optical density power spectrum. A Fourier analysis of the digital gray level image is performed to determine the gray level optical density power spectrum and spectral components. The spectral components of the gray level optical density power spectrum are compared to a visual sensitivity power spectrum for determining whether artifacts are present.

In all embodiments, color levels are flagged as either having artifacts or as being artifact-free. Once all of the color levels are examined and flagged, one of several color level removal procedures may be implemented to generate an artifact-free threshold matrix or an optimized threshold matrix.

It is, therefore, an advantage of the present invention to provide for the high quality rendering of images.

It is another advantage of the present invention to provide a method of generating artifact-free threshold matrices for display devices.

It is a further advantage of this invention to provide artifact-free multi-cell halftone threshold matrices.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to illustrate the principles of this invention.

FIG. 3 is a diagram illustrating a multi-cell halftone arrangement.

DETAILED DESCRIPTION OF ILLUSTRATED EMBODIMENT

Figure 1:
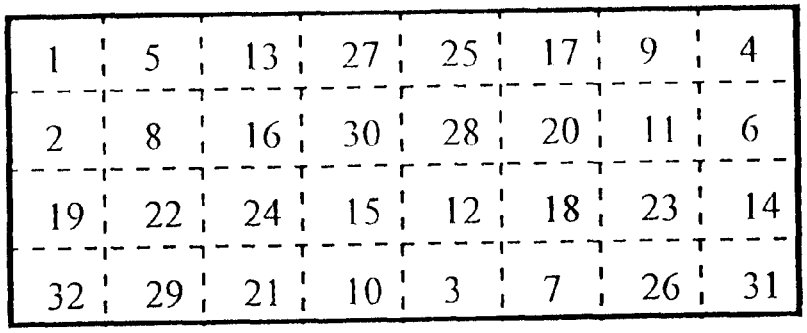
FIG. 1 is diagram illustrating a single cell matrix.

While the present invention is applicable to all color levels, the detailed description will focus on the best mode application of gray color levels (i.e., gray levels). Referring now to FIG. 1, a rectangular halftone cell having a 4×8 pixel turn-on sequence matrix is generally indicated at 100. As will be explained in more detail below, a turn-on sequence matrix may also be a threshold matrix. A threshold matrix is an array of numbers filling a halftone cell which defines the pixels to be blackened when compared to the gray levels of an original gray scale image.

To simplify the illustration, the matrix shown generally at 100 is a turn-on sequence. The sequence numbers in the matrix range from one (1) to the maximum number of gray levels. The first pixel of the turn-on matrix that is turned on is designated by the number one (1) and subsequent pixels are labeled according to their turn-on order or sequence. The maximum number of gray levels is generally equal to the total number of pixels in the halftone cell. Threshold values are usually designated by numbers from zero (0) to 255, where zero (0) is black and 255 is white. Assuming the pixels in the image to be rendered by the halftone are at the same resolution as the halftone (e.g., 600 dots per inch (dpi)), the threshold matrix is compared to the gray levels of the image to determine the pixels to be turned on. In this example, the turn-on sequence matrix and threshold matrix have a one-to-one relationship and can be converted from one to the other. The values of the threshold matrix are generally equal to 256 minus the values of a scaled turn-on sequence matrix. A scaled turn-on sequence matrix is generated by multiplying all of the elements in the turn-on sequence matrix by a predetermined factor such that the maximum value in the matrix is 255.

Figure 2:
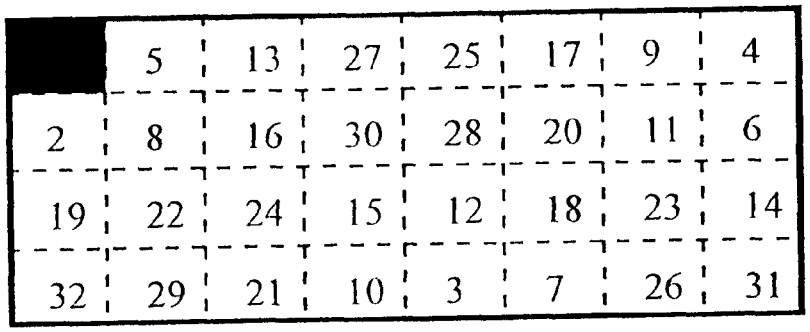
FIG. 2 is a diagram illustrating the single cell matrix of FIG. 1 with a blackened pixel.

Thus, for example, as generally shown at 200 of FIG. 2, the pixel identified by the number 1 is the first pixel to be blackened or turned on for a first gray level. Similarly, pixels identified by the numbers 1 and 2 would be turned on for the second gray level and so on. It should be noted that the threshold matrix of FIGS. 1 and 2 is shown for purposes of illustrating how gray levels are generated using halftone cells and should not be limited to the specific pixel turn-on sequence shown in FIGS. 1, 2, and 3. Other threshold matrices exist and yet others may be similarly developed. For example, the threshold matrices may have cell shapes which are diamond, hexagonal, etc., in addition to rectangular cell shapes.

Referring now to FIG. 3, a multi-cell halftone arrangement 300 is illustrated. The multi-cell halftone arrangement 300 includes, for example, a plurality of halftone cells which form a comprehensive threshold matrix defining the specific pixels to be blackened for a particular gray scale. By way of example, the multi-cell halftone arrangement 300 shows a 16×16 multi-cell arrangement. Through this arrangement, a large number of gray levels can be achieved as compared to single cell halftoning. More specifically, the 16×16 multi-cell halftone 300 allows for 257 gray levels, whereas a 4×8 single cell halftone allows for only 33 gray levels.

Figure 4:
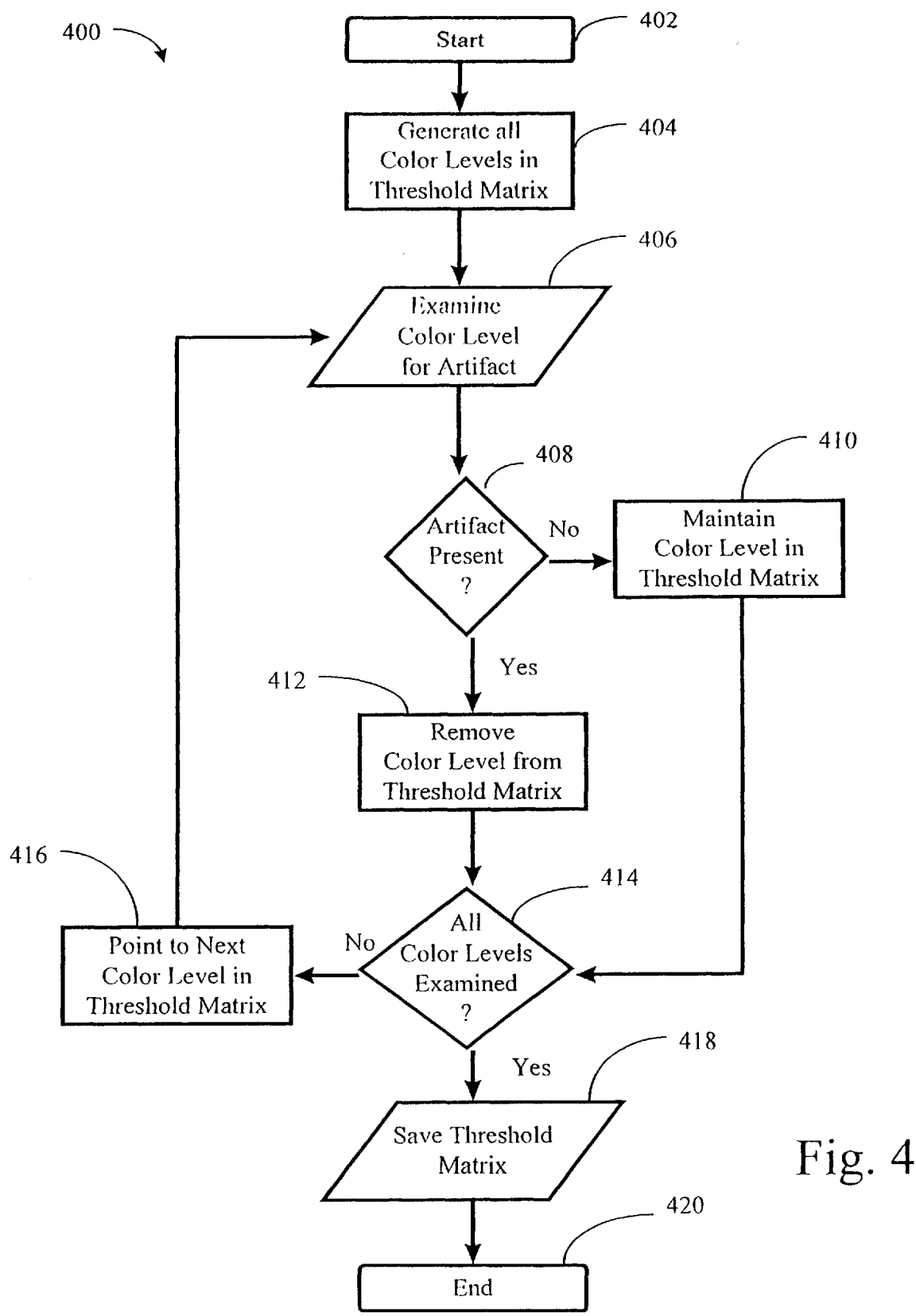
FIG. 4 is a flowchart illustrating the artifact removal procedure of the present invention.

Illustrated in FIG. 4 is an artifact removal procedure 400 of the present invention. In the preferred embodiment, the artifact removal procedure 400 is manually implemented. However, automation of the artifact removal procedure 400 via a computer control process may be preferable in the alternative. The automation of the artifact removal procedure is preferably implemented in the form of software logic executing on a general purpose personal computer, specific purpose computer, or a networked computer.

The artifact removal procedure commences at step 402 and advances to step 404 where all of the gray levels (i.e., color levels) for a particular threshold matrix are generated. The generation of the gray levels may include the printing of each gray level on a printer or a digital memory mapping of each gray level. After step 404, the artifact removal procedure 400 advances to steps 406 and 408 where each gray level is examined for an artifact or artifacts. In the preferred embodiment, the examination is performed by printing each gray level and visually examining the gray level for objectionable artifacts (i.e., visually disturbing clustered dot patterns). Alternative embodiments of steps 406 and 408 are shown in FIGS. 5 and 6 and described in the text associated with those Figures.

If an artifact is not present in the gray level, then the procedure advances to step 410 where the gray level under examination is flagged as a gray level which should be maintained in the threshold matrix. However, if an artifact is present in the gray level, the logic advances to step 412 where the gray level is flagged for removal and the threshold matrix is accordingly modified. After either step 410 or 412, the procedure advances to step 414 where it is determined if all of the gray levels have been examine for artifacts. If all of the gray levels have not been examined for artifacts, the procedure advances to step 416 where the next gray level is designated for examination. After step 416, the procedure loops back to step 406 to examine the designated gray level. This is continued until all of the gray levels have been examined. If all of the gray levels have been examined, the logic advances from step 414 to step 418. In step 418, all of the gray levels which have been flagged as being free of artifacts are represented in a new threshold matrix which is then stored in or interfaced to a memory in a display device such as, for example, a printer. As will be described in more detail hereinafter, the generation of a new or optimized threshold matrix may be by one of several procedures.

Figure 5:
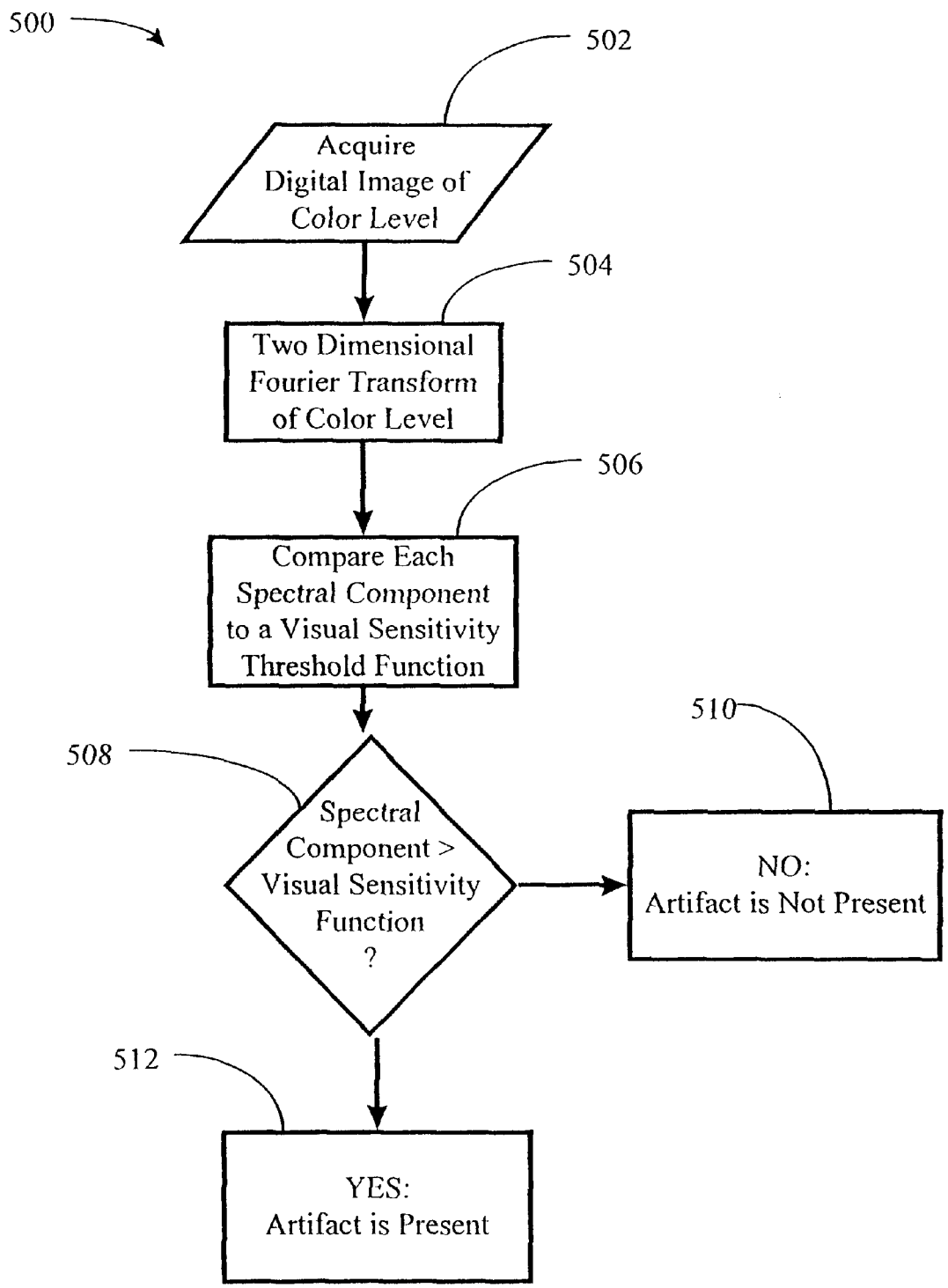
FIG. 5 is a flow chart illustrating one embodiment of an examination and artifact determination procedure.
Figure 6:
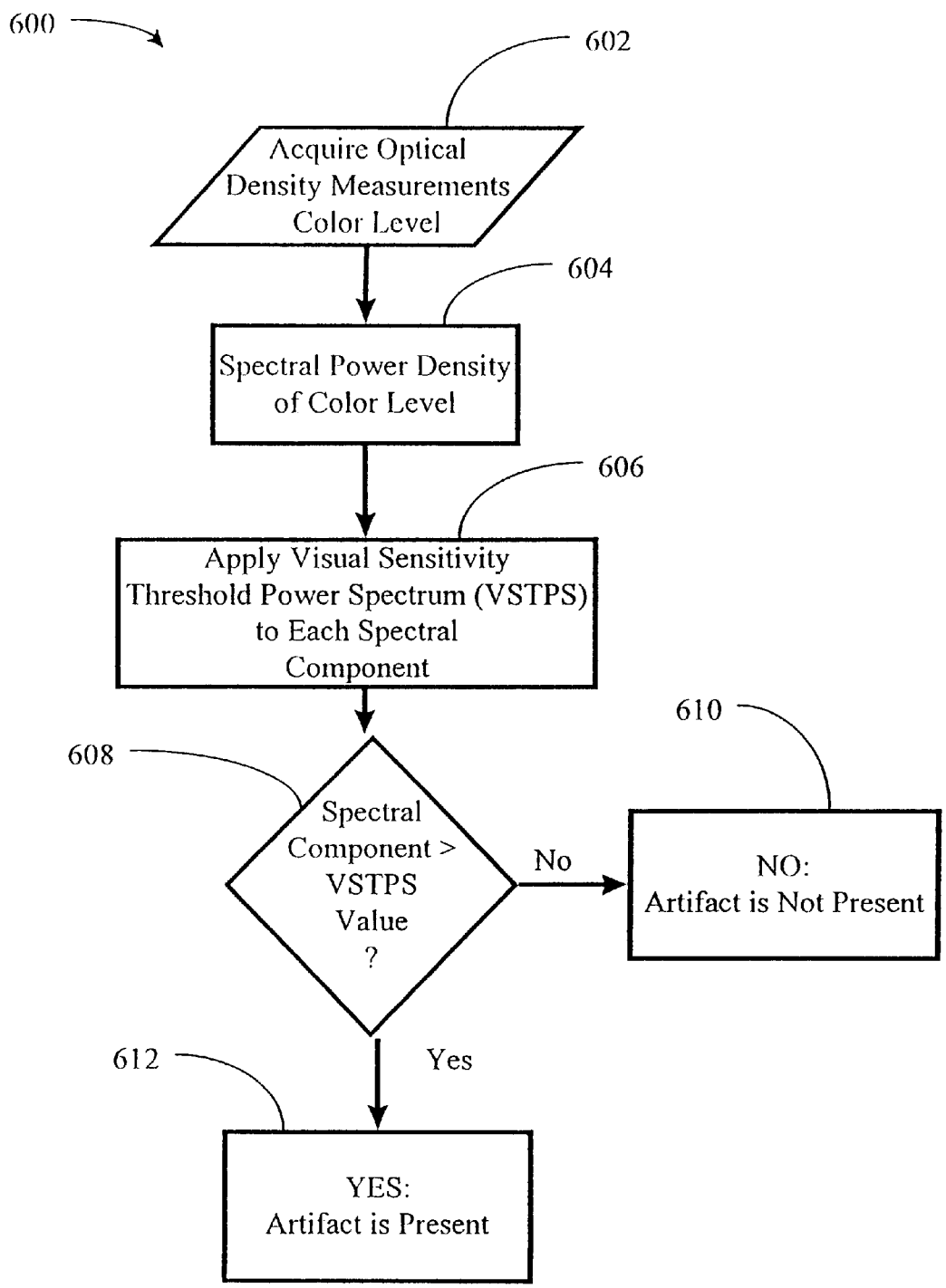
FIG. 6 is a flow chart illustrating another embodiment of an examination and artifact determination procedure.

Referring now to FIG. 5, a first procedure 500 for examining and determining whether an artifact is present is illustrated. The procedure 500 is preferably implemented as software logic running on a computer system. For example, the logic may be implemented on an IBM APTIVA® personal computer system or an IBM RISC 6000 computer system.

The procedure 500 commences at step 502 where a digital image of each gray level is acquired. The digital image of each gray level is preferably acquired via a high-resolution, flat-bed scanner to arrive at a digital optical density representation of the gray level. After step 502, the procedure 500 advances to step 504 where a two dimensional Fourier transform is performed on the digitized optical density. The two dimensional Fourier transform of the digitized optical density results in the generation of two dimensional spectral components which define the digitized gray level. After step 504, the procedure 500 advances to steps 506 and 508 where each spectral component is compared to a visual sensitivity threshold function by using the radial frequency of the spectral components. The radial frequency of the spectra is defined by equation (1):

$$\text{Radial Frequency} = \sqrt{(Fx^2 + Fy^2)} \quad (1)$$

wherein Fx is a first dimension spectral component and Fy is a second dimension spectral component. The visual sensitivity threshold function is defined as a measure of how well the human eye can detect changes in optical density. More specifically, it is known that the human eye is more sensitive to certain spectral components, or spatial frequencies, than others.

In particular, the visual sensitivity threshold function is sometimes referred to as "contrast sensitivity." The human eye becomes less sensitive to frequencies above about 5 cycles/degree and below about 2 cycles/degree. At a reading distance of approximately 300 mm, one (1) cycle/degree is equivalent to about 0.19 cycles/mm. This frequency range generally establishes a threshold detectable level. Additionally, the human visual system can be characterized as a system which responds as a bank of spatial frequency filters having different center frequencies.

The visual sensitivity threshold function employed by the present invention is preferably established by presenting test patterns (i.e., preferably swept sinusoidal grating bars) at various frequencies and luminance levels to establish a threshold of visibility for human vision. The luminance for the test patterns is preferably defined by the following formula (2):

$$\text{Luminance} = L_0 + L \sin(2 \pi f x) \quad (2)$$

where $L_0$ is an average luminescence value, L is the luminescence, f is the spatial frequency of the target pattern, and x is distance. The distance x is approximately 300 mm which corresponds to a typical reading distance for printed documents. The contrast for the grating bar is defined by the following formula (3):

$$\text{Contrast} = \frac{L_{max} - L_{min}}{L_0} \quad (3)$$

where $L_{max}$ is the maximum luminance of the bar and $L_{min}$ is the minimum luminance. The peak-to-peak optical density differential $\Delta OD$ of the test pattern or grating is preferably determined by the following formula (4):

$$\Delta OD = \left(\frac{2}{\ln(10)}\right)\left(\frac{L_{max} - L_{min}}{L_0}\right) \quad (4)$$

Based on physically observable data for the human vision system (which resembles a "U" shaped contrast sensitivity function), formula (4) can be approximated by the following formula (5):

$$\Delta OD = \exp[a_1 + a_2 f + a_3 \ln(f) + a_4 [\ln(f)]^2] \quad (5)$$

where $a_1$ is $-5.602$, $a_2$ is $0.2614$, $a_3$ is $0.0710$, $a_4$ is $0.3886$, and f is in cycles/mm. The resulting minimum detectable peak-to-peak optical density variation for the human visual system is approximately between 0.004 and 0.005.

In step 512, gray levels which have spectral components greater than the visual sensitivity threshold function are flagged as having artifacts. In step 510, gray levels which do not have spectral components greater than the visual sensitivity threshold function are flagged as not having artifacts.

Referring now to FIG. 6, a second procedure 600 for examining and determining whether an artifact is present is shown. In particular, the procedure 600 starts at step 602 where optical density measurements of each gray level are acquired. This step is preferably implemented by examining a printed sample of all of the gray levels with a microdensitometer. The microdensitometer preferably employs a slit aperture which is approximately one pixel wide. The length of the slit is in the range of less then the size of a halftone cell. Alternatively, a flatbed scanner having a CCD array wherein the acquired data is processed to simulate scanning using a narrow slit may be employed. The optical density measurements are first acquired in the x direction dimensional component of a conventional x,y two dimensional coordinate system and are then analyzed. Following completion of the analysis of the x direction dimensional component data, the procedure 600 is repeated for data acquired in the y direction dimensional component.

After 602, the procedure 600 advances to step 604 where the spectral power density of the optical density in each direction is obtained independently. Following step 604, the procedure 600 advances to steps 606 and 608 where a visual sensitivity threshold power spectrum (VSTPS) is compared to the power spectrum of the gray level for both the x and y directions. The visual sensitivity threshold power spectrum is obtained empirically and represents the threshold power spectrum of the optical density at which no disturbing changes are observed for different spatial frequencies.

In step 608, each spectral component of the gray level optical density power spectrum is then compared at a corresponding frequency to the visual sensitivity threshold power spectrum to determine whether it has a greater amplitude. Accordingly, if any spectral component of the gray level optical density power spectrum is greater than the corresponding visual sensitivity threshold power spectrum values, the gray level is flagged in step 612 as having artifacts. However, if all of the spectral components of the gray level optical density power spectrum are less than the corresponding visual sensitivity threshold power spectrum values, the gray level is flagged in step 610 as not having artifacts. Once analysis has been completed in the first direction dimensional component (e.g., x direction), the procedure is repeated in the second direction dimensional component (e.g., y direction).

After each gray level has been flagged as either having or not having artifacts, one of several elimination or removal procedures may be employed to generate a new or optimized threshold matrix. In the preferred embodiment, if the original threshold matrix allows for more than the required number of color levels for rendering a high quality image (e.g., approximately 60 gray levels), then all of the gray levels which include artifacts can be removed from the threshold matrix so long as at least a predetermined number of, for example, sixty (60), artifact-free gray levels remain in the threshold matrix. However, if the removal of the gray levels having artifacts causes the threshold matrix to have less than a predetermined number of artifact-free gray levels required to render a high quality image, then the gray levels having artifacts can be removed on a worst-case basis.

The worst-case basis removal is accomplished by determining, for example, the degree to which a gray level exhibits artifacts. This is implemented by first identifying the gray level as having artifacts (i.e., steps 406, 408 or steps 506, 508, or steps 606, 608) and second determining the difference of the two values compared in steps 406, 506, or 606. For example, in step 506, the quantitative difference between the spectral component and the visual sensitivity threshold function can be determined and be used as a measure for the worst-case basis removal procedure. If the worst-case basis fails to satisfy the gray level requirements, the entire turn-on sequence of the threshold matrix may have to be changed and the artifact removal process repeated on the changed threshold matrix.

As described above, the present invention is also generally applicable to non-gray color levels such as, for example, the color levels of a Cyan, Magenta, Yellow, and Black (hereinafter CMYK) color space. More specifically, each color level of the CMYK color space is analyzed for artifacts according the procedures shown and described in FIGS. 4, 5, and 6. Similarly, the color levels of a Red, Green, and Blue color space may also be analyzed for artifacts according the present invention.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, in creating an artifact-free threshold matrix, artifact-free gray levels can be duplicated, if required, to complete the number of gray levels required. Hence, creating a matrix with no pixel, or turn-on, gaps. for rendering a high quality image. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of selecting artifact-free color levels for rendering images, the method comprising the steps of establishing a threshold matrix having a plurality of color levels by generating a plurality of color levels, examining at least one of the color levels for artifacts and removing the color level from the threshold matrix if it has artifacts.

2. The method of claim 1 further comprising the step of examining a range of color levels for artifacts and removing the color levels from the threshold matrix which have artifacts.

3. The method of claim 2 further comprising the step of evenly distributing the remaining color levels over a range of color levels from a first color level to a last color level.

4. The method of claim 2 wherein the color levels are gray levels.

5. The method of claim 4 further comprising the step of distributing the remaining color levels over a range of color levels from black to white.

6. The method of claim 5 further comprising the step of integrating the threshold matrix to a PostScript standard.

7. The method of claim 3 further comprising the step of storing the threshold matrix in a memory.

8. The method of claim 7 comprising the step of interfacing the memory to a printer.

9. A method of selecting artifact-free gray levels for rendering images, the method comprising the steps of establishing a threshold matrix having a plurality of gray levels by generating a plurality of gray levels, examining at least one gray level for an artifact and if the gray level has an artifact, identifying the gray level for removal from the threshold matrix and removing the gray level from the threshold matrix.

10. The method of claim 9 wherein the step of examining at least one gray level for an artifact comprises the step of printing the at least one gray level and acquiring a digital image of the at least one printed gray level.

11. The method of claim 10 wherein the step of examining at least one gray level for an artifact further comprises the step of performing two dimensional Fourier transform to determine the spectral components of the at least one gray level.

12. The method of claim 11 wherein the step of examining at least one gray level for an artifact further comprises the step of comparing at least one spectral component to a visual sensitivity threshold function.

13. The method of claim 12 wherein the step of removing the gray level from the threshold matrix if it has an artifact comprises the step of removing the gray level if the at least one spectral component is greater than the visual sensitivity threshold function.

14. A method of selecting artifact-free gray levels for rendering images, the method comprising the steps of establishing a threshold matrix by examining the optical density power spectrum of at least one gray level for an artifact and if the gray level has an artifact, identifying the gray level for removal from the threshold matrix, wherein the step of examining the optical density power spectrum of the at least one gray level for an artifact further comprises the step of optically scanning the at least one gray level along a first dimensional component to arrive at a gray level optical density power spectrum.

15. The method of claim 14 wherein the step of examining the optical density power spectrum of at least one gray level for an artifact further comprises the step of step of optically scanning the at least one gray level along a second dimensional component to arrive at a gray level optical density power spectrum.

16. The method of claim 14 wherein the step of examining the optical density power spectrum of at least one gray level for an artifact further comprises the step of comparing a visual sensitivity threshold power spectrum to the optical density power spectrum of at least one gray level.

17. The method of claim 15 wherein the step of examining the optical density power spectrum of at least one gray level for an artifact further comprises the step of comparing a visual sensitivity threshold power spectrum to the optical density power spectrum of at least one gray level.

18. The method of claim 16 wherein the step of examining the optical density power spectrum of at least one gray level for an artifact further comprises the step of identifying the gray level as having an artifact if the at least one spectral component is greater than any spectral component of the visual sensitivity threshold power spectrum.

* * * * *